UNITED STATES PATENT OFFICE.

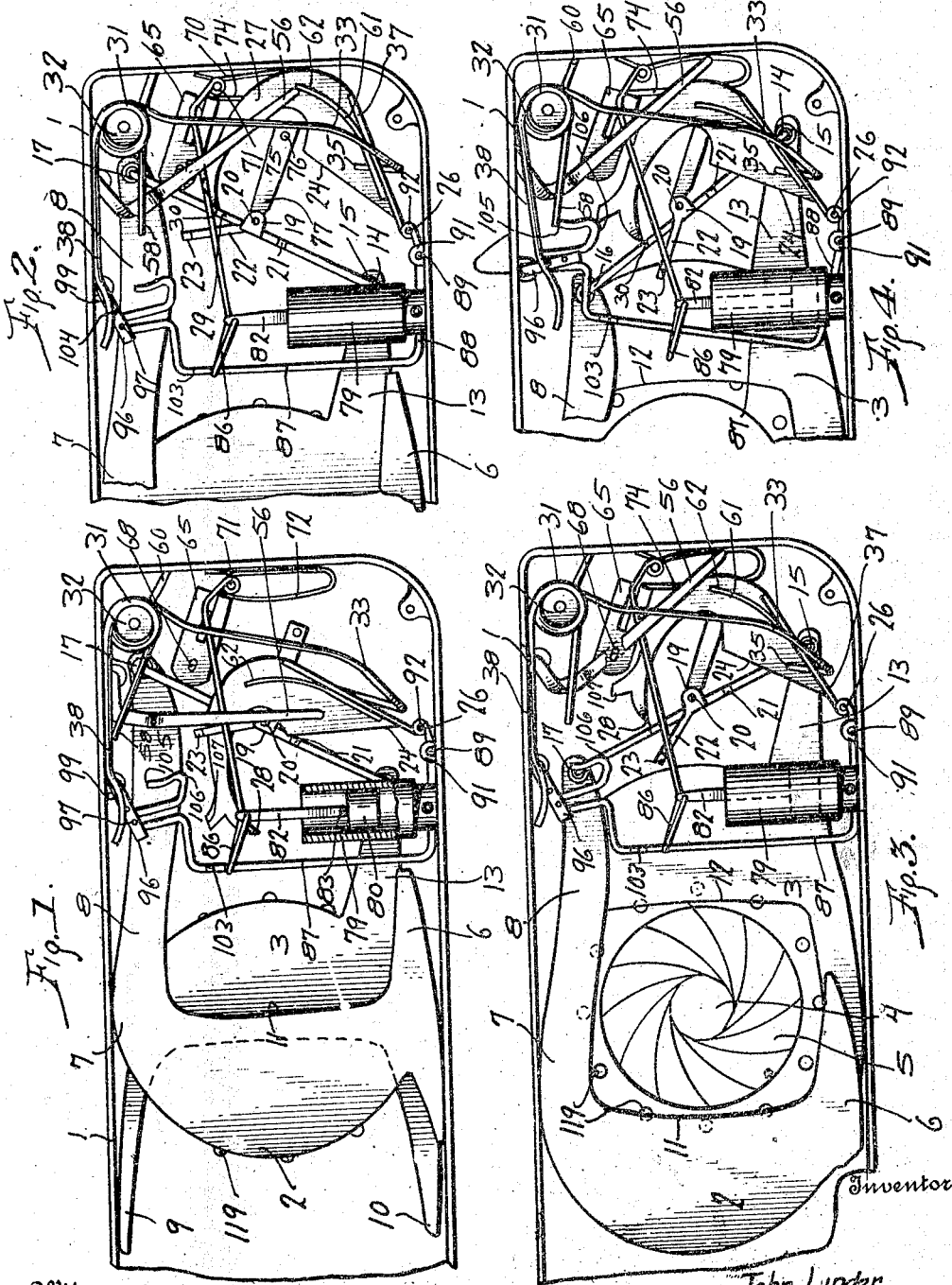

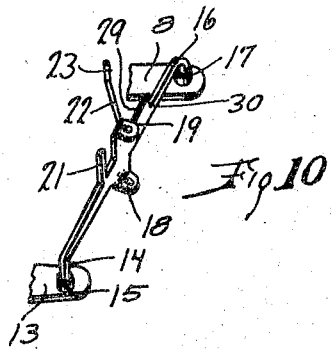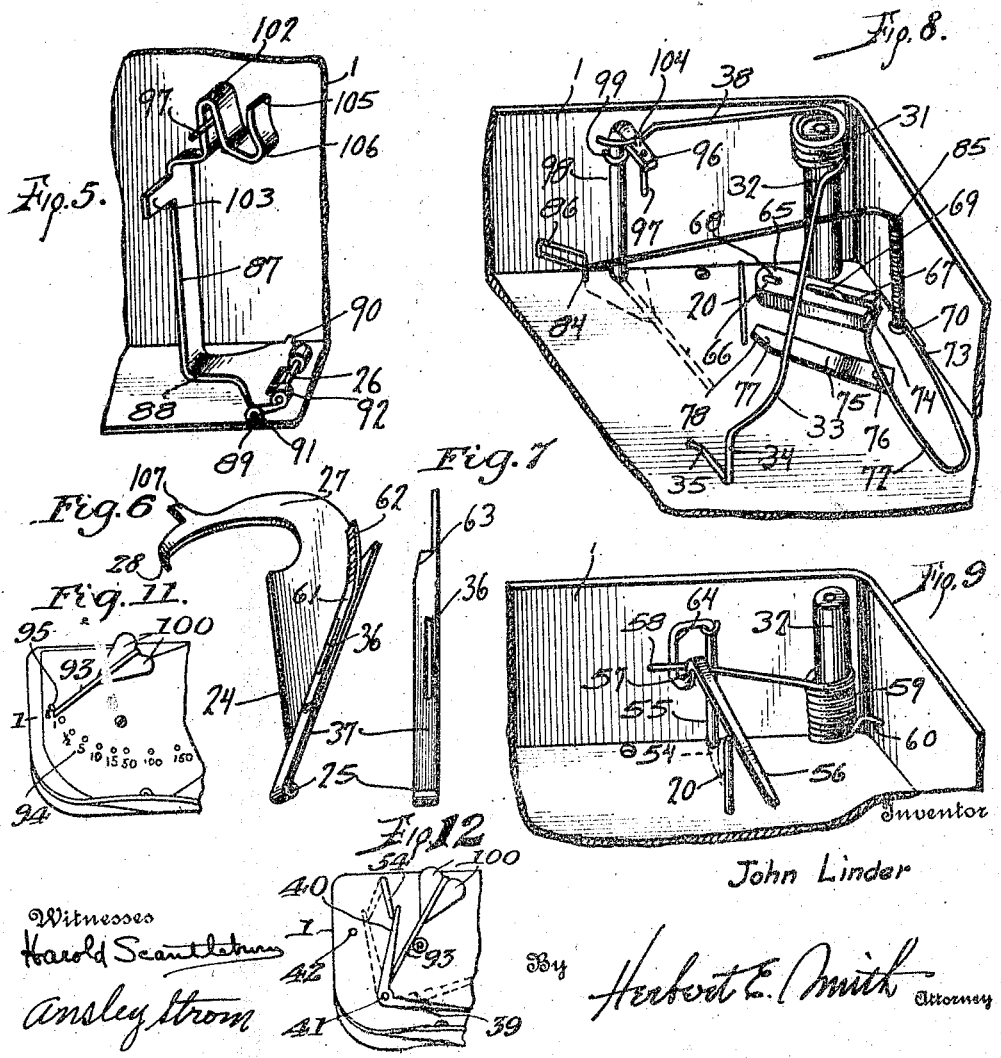

JOHN LINDER, OF SPOKANE, WASHINGTON.

CAMERA-SHUTTER.

1,129,303.  Specification of Letters Patent.  Patented Feb. 23, 1915.

Application filed April 13, 1914. Serial No. 831,551.

*To all whom it may concern:*

Be it known that I, JOHN LINDER, a subject of the King of Sweden, residing at Spokane, in the county of Spokane and State of Washington, have invented new and useful Improvements in Camera-Shutters, of which the following is a specification.

This invention relates to improvements in photographic apparatus and has to do more particularly with an improved form of shutter, novel operating means therefor whereby various characters of operation of the shutter may be obtained.

A further object is to provide shutter operating mechanism which can be varied in its operation with respect to time, and with respect to what is known as instantaneous exposures, and also, with respect to what is known as "bulb" exposures, this feature of my invention including various independently and interdependently acting means.

Other features of novelty will be more fully described in connection with the accompanying drawings and which will be more particularly pointed out in and by the appended claims.

In the drawings: Figure 1 is a view in elevation of the shutter and its mechanism with the same illustrated in a closed position. Fig. 2 is a view of the shutter controlling mechanism when the same is about to trip to open the shutters. Fig. 3 is a view similar to Fig. 1, with the shutter open. Fig. 4 is a view showing the shutter operating mechanism in one self sustaining position which it would assume for a bulb exposure. Fig. 5 is a view in perspective of a portion of the shutter operating mechanism for varying the time or duration of action of the shutters. Fig. 6 is a perspective view of a master shutter operating member shown detached. Fig. 7 is an edge view of said member. Fig. 8 is a fragmentary perspective view of another portion of the shutter operating mechanism. Fig. 9 is a similar view of still another portion thereof. Fig. 10 is a detail detached perspective view of a blade operating member. Figs. 11 and 12 are fragmentary face views of the exterior of the shutter casing showing improved mechanism thereon.

Like characters of reference designate similar parts throughout the different figures of the drawings.

I will first describe my improved shutter blades and the operating mechanism therefor.

As illustrated, 1 designates a shutter case in which my improved blades 2 and 3 are mounted to be shifted into closed and opened positions abreast of the opening 4 formed by the iris diaphragm leaves 5. The blade 2 has bearing portions 6 and 7 for sliding engagement against the walls of the shutter case 1, and the bearing portion 7 is elongated to form a connecting arm 8. The shutter blade 3 is forked, as indicated at 9 and 10, for engagement with the walls of the shutter case 1, it being understood that the forked bearing portions 9 and 10 and the bearing portions 6 and 7 function to hold the shutter blades to straight lines of movement.

A novel feature is embodied in my improved shutter blades which consists in providing each blade with a shutter or closing edge which is continuously and substantially straight and which extends diametrically across the lens opening, the length of the edges being greater even than the opening provided by the iris diaphragm leaves thereby insuring a full capacity for light passage during opening movement of the blades.

As shown, blade 2 has a closing or opening edge 11 and blade 3 has an edge 12 which embody the foregoing feature and which are arranged to close in over lapping relation, as will be clearly seen by reference to Fig. 1. The blade 3 is provided with an extension or arm 13, the purpose of which will now be described.

A blade operating member is shown in detail more clearly in Fig. 10, in the form of a bar having an end 14 pivotally connected in a socket 15 with the blade arm 13, and an end 16 pivotally connected in a socket 17 with the blade arm 8. The blade operating bar is provided between its ends with bent over bearing lips 18 and 19 which are suitably apertured to turn on a fixed spindle 20, mounted on the shutter case. The operating bar or member is provided with an actuating projection 21 and with a dash pot timing arm 22, the latter having a bent or crank end 23.

In Figs. 6 and 7 I have shown in detail, a master operating member having an actuating edge 24 adapted for engagement in sliding contact against lug 21 to move the operating bar in one direction, which in the present construction is a blade closing direction of movement. The master operating member is provided with a pivot end 25 for engagement on a pivot spindle 26 to guide the master operating member in its swinging movement, as will hereinafter more fully appear. The master operating member is provided with an extension 27 having a resilient hooked-end 28 adapted to be sprung over a shoulder 29, formed on the blade operating bar, said shoulder 29 having an end 30 around which the hooked-end 28 is adapted to pass at one stage of the operation. The hooked-end is arranged to operate the blade operating member in a direction to open the blades 2 and 3. In the position shown in Fig. 2, the hooked-end 28 is bearing against the blade operating bar on the right hand side thereof and upon movement of the master member to the left, the hooked-end 28 will slide toward the pivot spindle 29, away from the shoulder end 30 until the parts reach approximately the position shown in Fig. 3. Continued movement of the master member to the left will cause the hooked-end 28 to move around the shoulder end 30 at that stage which may be termed the full blade opening position. Immediately after release of the hooked-end 28, the actuating edge 24 will engage projection 21 and reverse movement of the blade actuating bar to the position shown in Fig. 1 to close the blades 2 and 3. Thus it will be seen that movement of the master member from a right hand position to a left hand position functions to first open and then close the blades without necessitating reversal of movement of the master member, which reversal would necessarily involve a minute but material loss of time which would render the device less efficient. When the master member is returned from the position shown in Fig. 1 to the position shown in Fig. 2, the resilient hooked-end 28 will be sprung or flipped over the shoulder 29 in a manner to dispose said hooked-end 28 in a position to advance the blades.

Movement of the master member to open and close the blades for instantaneous work which is now and has been heretofore considered, is effected by means of a spring 31 which is shown wound or convoluted about a spring post 32, one end 33 being extended from the post and bent at 34 to project downwardly, and at 35 to form a hook-end for projection through a slot 36 in a flange 37 of the master member. The slot provides for the necessary relative movement of the spring with respect to the master member as will be seen by reference to Figs. 1 to 3. The remaining end of the spring 38, functions in a novel way and for a purpose which will hereinafter appear.

I will next describe the actuating mechanism for retracting the master member to a starting position against the action of spring 31. On the out side and front face of the shutter case 1, see Fig. 12, I pivotally mount a bell-crank lever having arms 39 and 40. The bell-crank lever is pivoted at 41 and I provide a stop 42 for limiting movement of said lever in one direction. An actuating means may be connected with arm 39, in any desired manner, not shown, to shift arms 39 and 40 of the bell-crank lever from the full line to the dotted line position, as shown in Fig. 12.

Inasmuch as all of the foregoing structure is old, excepting the bell-crank lever, I do not deem it necessary to further particularize regarding the same.

Reverting to the bell-crank lever, arm 40 thereof slidably engages an arm 54 which is mounted upon a spindle 55, and movement of the bell-crank lever from the full line to the dotted line position, will move arm 54 to the left of Fig. 12 thereby rotating spindle 55 to the right of Figs. 1 and 9. On the spindle 55 I mount a master member actuating arm 56 which is provided with a recessed portion 57 forming a shoulder in which an end 58 of an operating spring 59 seats. The spring 59 is wound about post 32 and the remaining end 60 abuts against the shutter case 1, as will be clearly seen by reference to Fig. 9. This spring 59 functions to maintain the bell-crank lever in the full line position shown in Fig. 12 and operation of the bell-crank lever by the pressure members 48 and 47 is against the action of spring 59.

I will next describe the manner in which arm 56 retracts and releases the master operating member. On the flange 37 I mount a trip or release spring 61, the free end 62 of which is tensioned to bend away from the flange 37 and toward the arm 56. It will also be noted by reference to Fig. 6, that the releasing end 62, extends beyond the flange 37. Flange 37 is slightly beveled as indicated at 63, to facilitate movement of the arm 56 from a position behind to a position in front of the flange 37. The recessed portion 57 forms an abutment 64 for engagement with the shutter case 1 to limit movement of the spindle 55 beyond the position shown in Figs. 9 and 12, under the action of spring 59. Now with the parts in a position shown in Fig. 1, which is a blade closing position, we will assume that the bell-crank lever is actuated to swing the arm 40 to the dotted line position. This will first engage arm 56 with spring 61 and as the master operating member moves to the right, as shown in Fig. 2, the end of arm 56 will ride along spring 61 until it reaches the releasing end 62 thereof and it will finally be moved over and beyond the releasing end 62 when the master operating member has been shifted into a retracted position, thereby freeing the master operating member for blade opening and closing movement to the left of Fig. 2, under action of spring 31. In order to prevent rebound in such a manner as to cause the blades 2 and 3 to partly open after being closed, I provide a buffer 65 which is slotted at 66 and 67 to receive guiding elements 68 and 69, respectively, so as to hold the buffer 65 to a straight line of movement. A buffer spring 70 is coiled about a post 71, and one end 72 is bent to lie against the shutter case 1, at 73, the free end 74 bearing against the buffer to advance the same toward the blade operating member. As the blades 2 and 3 approach a closing position, the blade operating member will strike the buffer, as shown in Fig. 1, and the buffer will cushion arresting movement of the blade operating member so as to neutralize any rebounding action. The remaining end of spring 70 functions in a novel manner and for a purpose which will hereinafter appear. It may be stated, at this point, that the blade operating member may be held on the spindle 20 by a leaf retainer 75, fixed to the shutter case at 76, and having a free end 77 which is arranged to overlap lip 18. The free end 77 is slightly beveled, as indicated at 78, to avoid engagement with the spindle 20.

I will next describe various novel means for timing the action of the shutter blades 2 and 3 to vary the periods of exposure and while these features relate more particularly and will be used to a greater extent in timed exposures, they also function advantageously in connection with instantaneous or "snap shot" work. A resistance or dash pot device is provided which includes a cylinder 79 and a piston 80. The piston 80 is provided with a piston rod 82 which is pivotally connected with the piston 80, at 83. The upper end of the piston rod 82 is pivoted to a cranked terminal 84 of a retarder spring 85, and in the present construction, the retarder spring 85 may be the remaining end of the buffer spring 70. The retarder spring 85 is tensioned to normally move the piston 80 into a retracted position or toward the open end of the cylinder 79 for a full stroke of the piston thereby prolonging exposure by slowing up the closing movement of the shutter blades. The retarder spring 85 is provided with a modifying terminal 86, acting in a manner which will presently appear. A modifying element 87 is shown in the form of a bar having a bent end 88 which is provided with trunnions 89 and 90. Trunnion 89 is journaled to the case 1 in a staple 91 and trunnion 90 may be directly journaled in one wall of the case 1. The bent end 88 is provided with extensions 92 for holding the pivot spindle 26 on which the master operating member is pivoted to swing. It will be noted that adjustment of the modifying member will raise or lower the spindle 26 and by changing the axis about which the master operating member swings, the action of end 28 with respect to the period of its release of the blade operating bar will be changed, thereby modifying either by lengthening or shortening the time of engagement of the master operating member. By lowering spindle 26, it will take end 28 a longer time to traverse shoulder 29 and pass around end 30 and by elevating 26, the end 28 will release the blade operating member more quickly.

I will next describe the manner in which the modifying element 87 is adjusted. On the front of the shutter case 1, I pivot a time exposure index arm 93, the free end of which traverses a graduated segment 94 on the shutter case. A stop 95 limits movement of the index arm toward the position shown in Fig. 11 which will be its adjustment for bulb exposure. Adjustment of the free end to the right of Fig. 11 will be made for various "snap shot" exposures. The pivot of said arm is journaled in the shutter case 1 and terminates in a bent end 96 having an adjusting pin 97. The pivot of said arm 93 is in the form of a spindle 98, one portion thereof being journaled to the case 1 at 99. Before describing the adjusting connection of arm 93 with modifying element 87, I will describe a novel feature by means of which the arm 93 will always be in a "snap shot" adjustment when the camera is closed, and therefore when it is opened. The arm 93 is provided with projections 100 which will project beyond the margin of the case 1 when the arm 93 is in any of the timed exposure adjustments so as to make it necessary to adjust arm 93 for snap shot work before the case 1 can be closed into the camera case not shown. The modifying element 87 is provided with a looped portion 102 which slidably engages adjusting pin 97. It will therefore be seen that adjustment of arm 93 will vary the position of modifying element 87 and also spindle 26 thereby altering or modifying the action of the hook 28 in moving around the shoulder 30. The modifying element 87 is provided with a lug 103 which coacts with the inclined modifying terminal 86 of spring 85. When arm 93 is in a "snap shot" adjustment, bent end 96 will occupy the positions shown in the "snap shot" adjustment in Figs. 1, 2 and 3 and this will dispose the lug 103 near the outer portion of terminal 86 thereby preventing upward or retracted movement of piston 80 under the action of spring 85 for a full retracted stroke movement, and limiting piston 80 to a relatively short stroke movement. As modifying element 87 is adjusted to the right, as shown in Fig. 4, it will dispose the lug 103 in the path of a more downwardly inclined portion of the terminal 86 thereby permitting the piston 80 to move upwardly a greater distance and correspondingly increasing its length of stroke.

It will be noted that the dash pot device acts as a resistance, and as there is nothing novel in a dash-pot device, *per se*, it will be understood that throughout the specification and claims I will use the term dash pot device as being broad enough to cover a resistance device. Attention is directed to the interdependent coaction between the modifying element 87 and the dash-pot and also between said element and the master operating member as it will now be clear that adjustment of element 87 not only modifies the action of the dash-pot device but also the master operating member.

I will next describe the manner in which adjustment of the modifying element alters the action of the spring which operates the master member. End 38 of spring 31 is disposed at one side of a pin 104 which is mounted on the bent or cranked end 96. Now it will be clear that the action of spring 31 will be weakened when the pin 104 is in the timed exposure adjustment shown in Fig. 4, and likewise, the spring 31 will be tensioned to act more strongly on the master member when the pin 104 is in the "snap shot" adjustment shown in Fig. 1. Thus the rapidity of action of the master member will be materially lessened for timed exposure and will be materially increased for "snap shot" work.

I will now describe another feature whereby movement of the shutters may be retarded for timed exposures. Arm 22 on the blade operating member, is arranged for engagement with spring 85 on movement of the blade operating member toward a blade opening position for timed exposures so as to resist opening movement of the blades by reason of the fact that downward movement of the piston 80 must necessarily precede opening movement of the blades. In the "snap shot" adjustment shown in Fig. 3, only a slight downward movement of the piston 80 results from engagement of the spring 85 by 23, by reason of the fact that the lug 103 engages the highest point of the terminal 86. However, in the Fig. 4 adjustment, for timed exposures, the lug 103 engages the terminal 86, at a lower point, thereby permitting the spring 85 to elevate piston 80 to a higher point. Thus it will be necessary for 23 to move the piston 80 downwardly a greater distance while the blades are opened thereby retarding opening movement.

When the modifying element is adjusted to the bulb exposure position shown in Fig. 4, a locking end 105 thereof will be disposed beneath spring end 58 and an elbow 106 will engage a retainer lug 107 and hold the master member, on which such lug is formed, in a retracted position against movement to the left of Fig. 4, as long as arm 56 is held in the extreme position shown in Fig. 4. In this adjustment of the parts, abutment 64 functions as a shoulder to hold 58 in engagement with 105. Of course when arm 56 is released for return movement, then the elbow 106 recoils to normal permitting final movement of the master member to close the blades. In the "snap shot" and timed adjustment it will be readily seen that part 105 will not be in a position to be engaged by 58 and therefore elbow 106 will not engage retaining lug 107.

While I have herein shown and described one specific form of my invention I do not wish to be limited thereto except for such limitations as the claims may import.

I claim:—

1. In a photographic shutter, shutter blades, an operating member connected with said blades, pivotally mounted master means movable in one direction for actuating said member to open and close said blades, and means for shifting the pivotal mounting of said master means to vary the action thereof on said member, substantially as described.

2. In a photographic shutter, shutter blades, an operating member pivotally mounted between its ends and having its ends pivotally connected with said blades, pivotally mounted master means movable in one direction for successively engaging said member slidably at points opposite the pivotal mounting of said member, and means for shifting the pivotal mounting of said master means to vary the action thereof on said member, substantially as described.

3. In a photographic shutter, shutter blades, an operating member pivotally mounted between its ends and having its ends pivotally connected with said blades, pivotally mounted master means for successively engaging said member slidably at points opposite the pivotal mounting of said member, and means for shifting the pivotal mounting of said master means to vary the action thereof on said member, substantially as described.

4. In a photographic shutter, shutter blades, an operating member connected with said blades, pivotally mounted master means for actuating said member to open and close said blades, and means for shifting the pivotal mounting of said master means to vary the action thereof on said member, substantially as described.

5. In a photographic shutter, shutter blades, a pivotally mounted operating bar connected with said blades and having a shoulder provided with a shoulder end, a pivotally mounted master member having a portion engaging said shoulder and releasable past said shoulder end, and means for shifting the pivotal mounting of said master member to vary the time of release of said portion by said shoulder end, substantially as described.

6. In a photographic shutter, shutter blades, a blade operating bar pivotally mounted between its ends and having its ends pivotally connected with said blades, said bar having a lug on one side of its pivotal mounting and a shoulder with a shoulder end on the other side of its pivotal mounting, a master member having a resilient hook-shaped end for slidable engagement against said shoulder to first move said bar to a blade opening position in one direction for release of said hook-shaped end beyond said shoulder end to permit of continued movement of the master member in the same direction, said master member having an actuating edge for sliding engagement against said lug to shift said bar in a reverse direction to close said blades during completion of movement of the master member in one direction, a shiftable pivotal mounting for the master member for varying the period of release between the hook-shaped end and the shoulder end, and means for retracting the master member for springing said hook-shaped end over said shoulder into a starting position, substantially as described.

7. In a photographic shutter device, a shutter, master operating means for actuating the said shutter, a spring having one end connected with said master means to operate the latter, and means connected with the other end of said spring to vary the tension of the latter and alter the action of said master means, substantially as described.

8. In a photographic shutter, shutter blades, a dash-pot device, means normally moving said dash-pot device into a retracted position, and a blade operating member for engagement with said means to retard opening movement of said blades, substantially as described.

9. In a photographic shutter, shutter blades, a dash-pot device, a shutter blade operating member, and means normally retracting said dash-pot device and disposed in the path of said blade operating member for engagement thereby to retard opening movement of said blades, substantially as described.

10. In a photographic shutter, shutter blades, a dash-pot device, a shutter blade operating member, means normally retracting said dash-pot device and disposed in the path of said blade operating member for engagement thereby to retard opening movement of said blades, and means for adjusting said first named means to vary the action of the latter on said member, substantially as described.

11. In a photographic shutter, shutter blades, an operating member for said blades, a buffer for cushioning movement of said member, a dash-pot device, and a spring having one end connected with said device to normally retract the latter and disposed in the path of said member to retard opening movement of the blades, the remaining end of said spring engaging said buffer, substantially as described.

12. In a photographic shutter, shutter blades, an operating member for said blades, a dash-pot device, a spring disposed in the path of said member for retarding the same on opening movement of the blades, said spring being connected with said dash-pot device to normally retract the same and having an inclined modifying terminal, and means for engagement at different points on said terminal to limit retractive movement of the dash-pot device by said spring, substantially as described.

13. In a photographic shutter, shutter blades, an operating member for said blades, a master member for actuating said operating member, a spring for actuating said master member, a dash-pot device, a spring normally retracting said dash-pot device and disposed in the path of said operating member to retard opening movement of the blades, and mechanism for varying the tension of the master spring and altering the action of the dash-pot spring, substantially as described.

14. In a photographic shutter, shutter blades, an operating member for said blades, a master member slidably engaging the operating member and releasable therefrom on opening movement of the blades, a spring for actuating said master member, a dash-pot device, a spring disposed in the path of said operating member to retard blade opening movement thereof and said spring being connected with said dash-pot device to retract the same, and mechanism for shifting the master member to vary the time of release of the operating member by the master member and varying the tension of the master operating spring and the dash-pot spring, substantially as described.

15. In a photographic shutter, shutter blades, an operating member for said blades, a master member slidably engaging the operating member and releasable therefrom on opening movement of the blades, a spring for actuating said master member, a dash-pot device, a spring normally acting to retract said dash-pot device and having an inclined modifying terminal and a portion of said spring lying in the path of said operating member to retard blade opening movement thereof, and a pivotally mounted modifying element pivotally supporting said master member and adapted for adjustment to shift the pivotal mounting of the master member and alter the time of release engagement with said operating member, said modifying member having a portion for engagement at different points on said inclined terminal to vary retraction of the dash-pot by its spring and thereby vary retarding action of said operating member by said spring, substantially as described.

16. In a photographic shutter, shutter blades, master operating means for operating said blades toward an opening movement, and modifying means for supporting and shifting said master means and engaging the same to arrest movement thereof beyond a blade opening position, substantially as described.

17. In a photographic shutter, shutter blades, master operating means for moving said blades toward an opening position, modifying means for supporting and shifting said master means, and a spring for effecting engagement of said modifying means with said master means to arrest movement of the latter beyond a blade opening position, substantially as described.

18. In a photographic shutter structure, a casing, a shutter device in said casing, shutter operating means in said casing having a swinging arm movable across the exterior of said casing, a bell crank lever pivoted to swing abreast of the exterior of said casing and having one arm in sliding engagement with said swinging arm, and operating means on the exterior of said casing connected with the other arm of said bell crank lever, substantially as described.

19. In a folding camera, a camera casing, a shutter casing foldable into said camera casing, a shutter device in said shutter casing including operating means, a swinging device exteriorly disposed on said shutter casing for adjusting said operating means for timed and "snap shot" exposures, said swinging device having a portion projecting from the shutter casing when said swinging device is in a timed exposure adjustment for engagement with the camera casing to shift said swinging device into a "snap shot" adjustment when the shutter casing is folded into the camera casing, substantially as described.

20. In a photographic shutter device, a shutter, a shutter operating element, a spring in the path of said element to be engaged thereby for retarding action of the shutter, a dash pot device connected with said spring to be retracted thereby, and means for varying the retraction of said dash pot device to modify the action of said shutter, substantially as described.

21. In a photographic shutter device, a shutter, a shutter operating element, a resistance device adapted to be engaged by said element to retard action of said element, and means for controlling the resistance device to vary the resistance thereof to the action of said element, substantially as described.

22. In a photographic shutter device, pivotally mounted devices one slidably engaging and actuating the other, a shutter connected for operation by the actuated device, and means for shifting the pivotal mounting of one of said devices to vary the action of said devices with respect to each other thereby varying the action of said shutter device, substantially as described.

23. In a photographic shutter device, pivotally mounted devices one actuating the other, a shutter connected for operation by the actuated device, and means for shifting the pivotal mounting of one of said devices to vary the action of said devices with respect to each other thereby varying the operation of said shutter device, substantially as described.

24. In a photographic shutter device, movable devices one for actuating the other, a shutter connected with one of said devices for operation thereby, and means for altering the operating position of one of said devices with respect to the other to vary the action of said devices thereby varying the action of said shutter device, substantially as described.

25. In a photographic camera, a shutter case, a shutter, operating means for the shutter including a master member, and manually adjustable means on the exterior of the shutter case for shifting the master member to vary the action thereof, substantially as described.

26. In a photographic shutter device, a shutter, master operating means for operating said shutter, a spring having one portion connected with said master means to operate the latter, and mechanism connected with another portion of the spring to vary the tension of the latter and alter the action of said master means, said mechanism being also connected with said master means to shift the latter and vary the action thereof, substantially as described.

In testimony that I claim the foregoing as my own, I hereby affix my signature in the presence of two subscribing witnesses, this 4th day of April, 1914.

JOHN LINDER.

Witnesses:
HAROLD SCANTLEBURY,
ANSLEY STROM.